United States Patent [19]

Kane et al.

[11] Patent Number: 4,788,797
[45] Date of Patent: Dec. 6, 1988

[54] SELF-SUPPORTING HAND-HELD GRINDING DEVICE

[75] Inventors: Jeffrey P. Kane, Renton; Steven E. Franklyn, Redmond, both of Wash.

[73] Assignee: The Boeing Company, Seattle, Wash.

[21] Appl. No.: 107,254

[22] Filed: Oct. 9, 1987

[51] Int. Cl.⁴ .................................................. B24B 9/00
[52] U.S. Cl. .................................. 51/170 PT; 51/273; 409/180
[58] Field of Search ........... 51/170 R, 170 T, 170 PT, 51/173, 273, 241 S, 208; 76/83; 409/180, 182

[56] References Cited

U.S. PATENT DOCUMENTS

| | | | |
|---|---|---|---|
| 3,006,390 | 10/1961 | Draenert | 144/117 |
| 3,164,932 | 1/1965 | Morith | 51/170 |
| 3,499,365 | 3/1970 | Needham | 90/12 |
| 3,628,579 | 12/1971 | Roche | 144/134 |
| 3,893,372 | 7/1975 | Strakeljahn | 90/12 |
| 3,913,447 | 10/1975 | Roche | 90/12 |
| 4,051,880 | 10/1977 | Hestily | 144/252 |
| 4,279,554 | 7/1981 | Seidenfden | 409/180 |
| 4,288,187 | 9/1981 | Wanner et al. | 409/180 |
| 4,290,464 | 9/1981 | Marsan | 144/136 |
| 4,417,835 | 10/1983 | Lund | 409/180 |
| 4,655,653 | 4/1987 | Hall et al. | 409/182 |

FOREIGN PATENT DOCUMENTS 962140 4/1957 Fed. Rep. of Germany .... 51/170 T
3113492 10/1982 Fed. Rep. of Germany .... 51/241 S Primary Examiner—Roscoe V. Parker
Attorney, Agent, or Firm—Christensen, O'Connor, Johnson & Kindness

[57] ABSTRACT

A self-supporting hand-held grinding device (10) for beveling the edges of a part having a compound contoured surface includes a frame (12) having a flat triangular-shaped base (22) and an integrally formed arm (24) with a cylindrical flange (26) projecting from the arm (24) to which is attached a grinding tool (14). The longitudinal axis of the cylindrical flange (26) is oriented such that the longitudinal axis X of the grinding tool (14) tilts away from the longitudinal axis (W) of the base (22) by an angle, α, lying in the range of 5° to 8°, and preferably at 7.5°. Three legs (46) are attached to the base (22) by a retaining nut (58) and are adjusted in height by backing off a knurled locking nut (60) and turning the shaft by means of an adjusting nut (68). A foot (48) having a socket (52) is pivotally mounted to the ball-shaped supporting end (50) of each leg (46). A hand knob (62) projects from the top surface (40) of the base (42) and is held in place by a spacer (64) and a cap screw (66). A cylindrical tube (39) attached over an opening (44) in the base (22) allows suction to be applied to a shroud (32) surrounding the drum sander (16) to remove ground off particles.

14 Claims, 1 Drawing Sheet

SELF-SUPPORTING HAND-HELD GRINDING DEVICE

TECHNICAL AREA

This invention relates to griding devices and, more particularly, to a self-supporting hand-held grinding device for beveling the edges of a part having a compound contoured surface.

BACKGROUND OF THE INVENTION

While the present invention was developed for use in beveling the forward leading edges of aircraft engine cowlings, and is described in this environment, it is to be understood that the invention can be used in other environments where it is necessary to bevel the edge of a compound contoured surface, i.e., a surface that has a contour that varies continually in the degree of arc that it describes.

The contruction and repair of metal or composite aircraft skin requires the smooth joining of sections of sheet metal. This is especially critical around the forward leading edges and aft trim line of the engine cowlings on high-speed aircraft because small protuberances between adjoining skin sections will cause loss of laminar air flow over the cowling and nearby wing surfaces, thus inducing drag and causing loss of lift. Because modern aircraft engine cowlings have compound contoured surfaces, hand-supported portable grinding tools must be used to dress off butt joints around the cowlings. Supporting a heavy grinding tool by hand makes it difficult to bevel a butt joint to achieve a smooth and uniform surface. In addition to being time consuming, the use of hand-supported grinding tools requires skill and experience to accurately perform the operation.

As a result, there is a need for a self-supporting hand-held grinding device that will facilitate precise and efficient beveling of butt joints around a part having a compound contoured surface.

Existing self-supporting portable grinders are unsuitable for a number of reasons. First, such tools typically use a large, flat guide plate for supporting the tool above the part surface in order to achieve a uniform depth of cut. Such a guide plate is unsuitable in the present application because it cannot securely support the tool as it is moved around a compound contoured surface. Another disadvantage is that these tools utilize a guide mechanism that requires reference to a surface other than the edge being bevelled, whereas most aircraft structural surfaces, including engine cowlings, have no such reference surface. A further disadvantage of existing tools is that no means is provided for removing the particles that have been ground off. This is important for the present application because small particles falling into an aircraft engine can damage and possibly destroy the engine. The foregoing and other disadvantages are overcome in the present invention.

SUMMARY OF THE INVENTION

In accordance with this invention, a self-supporting hand-held grinding device for beveling the edges of a part having a compound contoured surface is provided. The hand-held grinding device includes: a grinding tool that includes a high speed air motor and an abrasive grinding element mounted on the shaft of the motor; a tool holding member for holding the grinding tool; and, three legs for supporting the tool holding member above the surface, with the legs being arranged in a triangular configuration. Each leg has a pivotal foot attached thereto for sliding over the compound contoured surface. Preferably, each of the legs is individually adjustable to permit adjustment in the depth and angle at which the grinding tool grinds the edge of the contoured surface.

In accordance with another aspect of the present invention, the self-supporting hand-held grinding device comprises a frame member having an outer surface, an inner surface, and a longitudinal axis. A handle is attached to the frame member. An integrally formed tool mounting means attaches the grinding tool to the frame member. A guide means in the form of an arm depends from the frame member to guide the device along the edge of the surface. The three legs are attached to the bottom surface of the frame member and support the frame member above the contoured surface.

In accordance with a further aspect of the present invention, the tool mounting means consists of a cylindrical flange that is integrally formed with the arm and is configured to hold the grinding tool so that the longitudinal axis of the grinding tool is positioned at a predetermined angle with respect to the longitudinal axis of the frame member. As a result, when each of the legs is adjusted to an equal length, the grinding tool will grind a bevel at the predetermined angle on the edge of the compound contoured surface. Preferably, the predetermined angle is in the range of 5° to 8°.

In accordance with still yet another aspect of the present invention, the self-supporting hand-held grinding device further comprises a vacuum port formed in the frame member for removing particles ground from the edge of the surface.

As will be readily appreciated from the foregoing description, the invention provides a self-supporting hand-held grinding device ideally suited for use on contoured surfaces, such as the contoured surfaces of aircraft engine cowlings. The tripod configuration of legs enables the device to be steadily supported as it is moved over the changing contours of the cowling surface to bevel the edges of the surface. The adjustability of the legs permits adjustment in the depth and angle at which the grinding tool bevels the edge of the surface. The use of the pivotally mounted feet permits the device to glide over irregularities in a contoured surface without binding the device or marring the surface. In addition, the vacuum port removes particles as they are produced. This is important when the surface is an aircraft engine cowling surface because the potentially destructive particles are removed from the engine intake area. Finally, the overall simplicity and lack of moving parts eliminates vibration resulting in the ability to achieve a more accurate and uniform bevel.

BRIEF DESCRIPTION OF THE DRAWINGS

The foregoing and other features and advantages of the present invention will become more readily appreciated as the same becomes better understood by reference to the following description, when taken in conjunction with the accompanying drawings wherein.

DESCRIPTION OF THE PREFERRED EMBODIMENT

Figure 1:
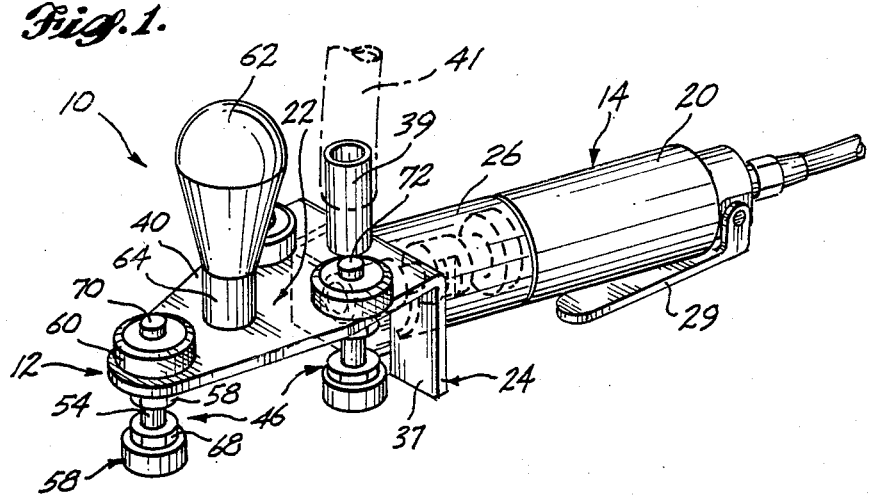
FIG. 1 is an isometric view of a self-supporting hand-held grinding device formed in accordance with the present invention.
Figure 2:
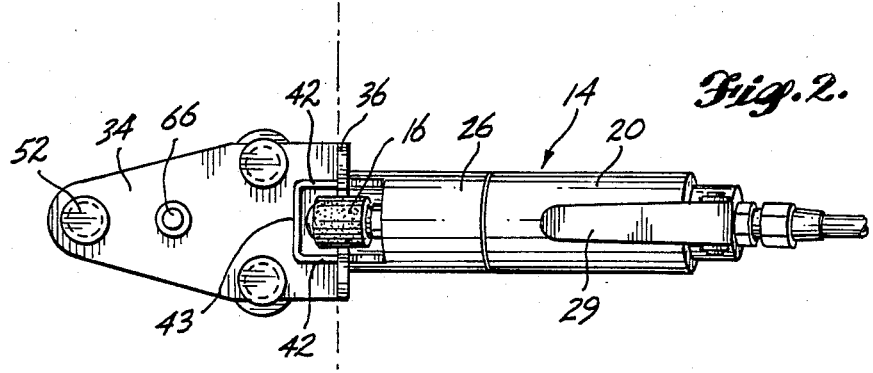
FIG. 2 is a bottom view of a self-supporting hand-held grinding device illustrated in FIG. 1.
Figure 3:
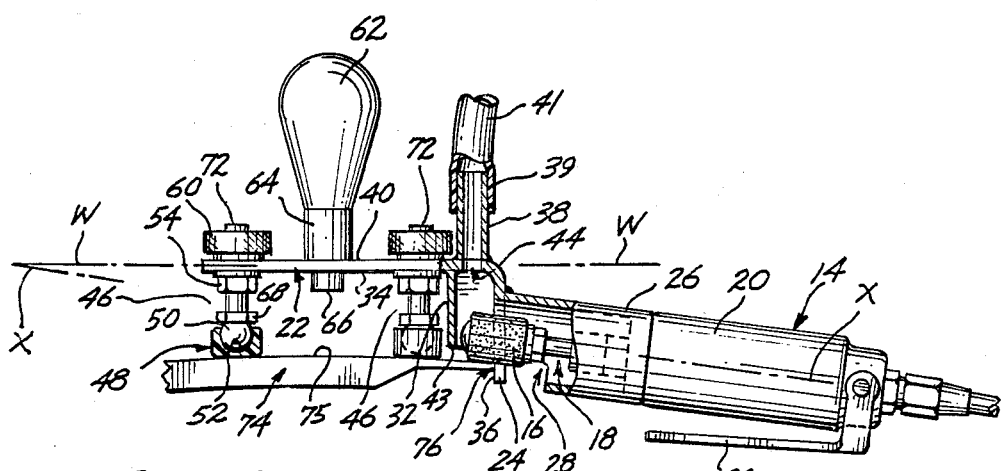
FIG. 3 is a partial cross-sectional view of the self-supporting hand-held grinding device illustrated in FIGS. 1 and 2 taken along line 3—3 of FIG. 2.

As depicted in FIGS. 1-3, a self-supporting hand-held grinding device 10 formed in accordance with this invention comprises a frame member 12 and a grinding tool 14. Preferably, the grinding tool 14 comprises a high speed, air-powered motor mounted in a hand grip 20 and having a drum sander 16 mounted at the tool end 18 of the motor.

The frame member 12 consists of a flat, triangular-shaped base 22 having an arm 24 located along one edge. Preferably, the arm 24 lies perpendicular to the base 22. Affixed to and projecting outwardly from the outer surface of the arm 24 is a cylindrical flange 26 having an internal bore 28 in which the grinding tool 14 is mounted. The grinding tool 14 is secured within the cylindrical flange 26 by a threaded connection or any other suitable securing means. The grinding tool 14 is thusly attached to the frame member 12 in a manner that allows the hand grip 20 of the grinding tool 14 to be used to hold and guide the hand-held grinding device 10. A trigger 29 located on the hand grip 29 actuates the grinding tool 14.

The drum sander 16 projects partway through a U-shaped opening 30 formed in the arm 24. A shroud 32 formed by the inner surface 34 of the base 22, the inner surface 36 of the arm 24, a pair of side walls 42 located on either side of the drum sander and an end wall 43 attached to the side walls 42 partially encloses the drum sander 16. The only exposed side of the shroud 32 is the one facing away from the base 22.

A vacuum port 38 formed by a cylindrical tube 39 is affixed to the outer surface 40 of the base 22, and a hole 44 formed in the base 22 and communicates with the shrouded area. Preferably, the cylindrical tube 39 is sized to receive a vacuum hose 41 in an air-tight manner.

Projecting through the base 22 are three legs 46 that are arranged in a triangular configuration to form a tripod support. One leg is positioned at each of the corners of the triangularly-shaped base 22. This configuration allows the three legs 46 to firmly support the frame member 12 above the part surface as the grinding device 10 moves over the varying contours. Three legs are chosen because the choice of four or more legs would result in the grinding device 10 rocking on two of the legs, and thus becoming unsteady, when the device is placed on a curved surface. To further steady the grinding device 10, and to facilitate sliding of the legs over the cowling surface, a foot 48 is attached to the supporting ends 50 of the legs 46. More specifically, the support end 50 of each leg 46 is ball-shaped. The balls are sized to be received inside a socket 52 formed in an associated foot 48. This permits the foot 48 to pivot about the supporting ends 50 of the legs 46 as surface irregularities or variations in the arc of the contour are encountered. Ideally, the foot 48 is constructed of nylon or other similar material to prevent marring of the surface.

The other end of each leg 46 includes a threaded shaft 54 that projects through an opening 56 in the base 22. Preferably, the shafts 54 are also threaded through a retaining nut 58 affixed to the inner surface 34 of the base 22. A knurled locking nut 60 threaded onto each shaft 54 bears against the outer surface 40 of the base 22 to prevent the leg 46 from turning. The legs 46 are adjusted in height to achieve the correct cutting depth and angle of bevel by backing off the knurled locking nut 60 and turning the shaft 54 by means of an adjusting nut 68. Once the legs are adjusted to the correct length, the knurled locking nuts 60 are retightened.

A hand knob 62 projects outwardly from the outer surface 40 of the base 22 to facilitate holding and guiding of the hand-held grinding device 10. The hand knob 62 is spaced above the outer surface 40 of the base 22 by a spacer 64. The hand knob 62 and the spacer 64 are affixed to the base 22 by a cap screw 66 that projects through a hole in the base 22.

Preferably, the longitudinal axis of the flange 26 and, thus, the longitudinal axis X of the grinding tool 14 tilts away from the longitudinal axis W of the base 22 by a slight angle, $\alpha$. While ideally, the angle, $\alpha$, is 7.5°, it may lie within the range of 5° to 8°, depending upon the application of an embodiment of the invention. Thus, when the legs 46 are adjusted to an equal length and the grinding device 10 is placed on the surface of a part to be ground, the drum sander will form a bevel angle equal to $\alpha$, in this case 7.5°. Adjustments in the bevel angle can be made by adjusting the legs to an unequal length. To increase the angle of bevel, the length of the leg 70 located furthest away from the drum sander 16 can be increased and/or the length of one or both of the other legs 72 can be reduced.

As shown in FIG. 3, the self-supporting hand-held grinding device 10 is used by placing it on a part 74 having an edge 76 to be beveled. The device 10 is positioned such that the feet 48 impinge on a surface 75 of the part 74 and, thus, provide firm support for the device 10. The device is also positioned such that the arm 24 presses against and can slide along the edge 76 to be beveled. Thus, the edge 76 guides the tool around the part 74. As particles are removed by the drum sander 16, they are picked up by suction applied to the vacuum port 38.

While a preferred embodiment of the invention has been illustrated and described, it will be appreciated that various changes can be made therein without departing from the spirit and scope of the invention. Consequently, within the scope of the appended claims, the invention can be practiced otherwise than as specifically described herein.

The embodiments of the invention in which an exclusive property or privilege is claimed are defined as follows:

1. A self-supporting hand-held grinding device for beveling the edges of a compound contoured surface, the device comprising:
    a grinding tool including a high speed motor and an abrasive grinding element mounted on the shaft of the motor;
    a tool holding member for holding said grinding tool, said tool holding member having a guide means for guiding said abrasive grinding element along an edge of a part having a compound contoured surface;
    three legs attached to said tool holding member for supporting the tool holding member adjacent to the compound contoured surface of said part, the legs arranged in a triangular configuration and oriented such that one end of the legs is positioned to impinge on the compound contoured surface of a part to be ground, each leg including a foot pivotally attached for sliding over said compound contoured surface.

2. The device of claim 1, wherein each of said legs are adjustably attached to said tool holding member to permit adjustment in the depth and adngle at which said abrasive grinding element bevels the edge.

3. The device of claim 2, wherein said guide means comprises an arm that depends from said tool holding member and bears against the edge to be beveled.

4. The device of claim 3, wherein said tool holding member has a longitudinal axis and is configured to hold the grinding tool such that the longitudinal axis of the grinding tool is positioned at a predetermined angle with respect to the longitudinal axis of the tool holding member, such that when said legs are adjusted at an equal length the abrasive grinding element will bevel the edge at the predetermined angle.

5. The device of claim 4, wherein said predetermined angle is in the range of 5° to 8°.

6. The device of claim 4, wherein said feet are formed of nylon to facilitate sliding over the part surface.

7. The device of claim 4, further comprising a vacuum means for removing particles ground from the edge.

8. A self-supporting hand-held grinding device for grinding the edges of a compound contoured surface, the device comprising:
 (a) a frame member having an outer surface, an inner surface, and a longitudinal axis;
 (b) a handle attached to the outer surface of the frame member;
 (c) a grinding tool including a high-speed motor and an abrasive grinding element mounted on the shaft of the motor;
 (d) a tool mounting means for mounting the grinding tool to said frame member;
 (e) a guide means depending from said frame member for guiding said abrasive grinding element along an edge of a part having a compound contoured surface; and,
 (f) three legs attached to the inner surface of said frame member for supporting the frame member adjacent to the compound contoured surface of said part, the legs arranged in a triangular configuration and oriented such that one end of the legs is positioned to impinge on the compound contoured surface of a part to be ground, each leg including a foot pivotally attached for sliding over said compound contoured surface.

9. The device of claim 8, wherein each of said legs is adjustably attached to said frame member to permit adjustment in the distance that said frame member is supported above the surface to permit adjustment in the depth and angle at which said abrasive grinding element bevels the edge.

10. The device of claim 9, wherein said tool mounting means is integrally formed on said guide means and is configured to hold the grinding tool so that the longitudinal axis of the grinding tool is positioned at a predetermined angle with respect to the longitudinal axis of the frame member such that when the legs are adjusted at an equal length, the abrasive grinding element will bevel the edge at the predetermined angle.

11. The device of claim 10, wherein said predetermined angle is in the range of 5° to 8°.

12. The device of claim 10, wherein said guide means comprises an arm that depends from said frame member and bears against the edge to be beveled.

13. The device of claim 10, wherein said feet are formed of nylon to facilitate sliding over the surface to be ground.

14. The device of claim 11, further comprising a vacuum means for removing particles ground from the edge.

* * * * *